United States Patent
Hanzawa et al.

(10) Patent No.: US 9,135,421 B2
(45) Date of Patent: Sep. 15, 2015

(54) AUTHENTICATION APPARATUS, CONTROL METHOD OF AUTHENTICATION APPARATUS, CONTROL PROGRAM AND RECORDING MEDIUM

(71) Applicant: OMRON Corporation, Kyoto (JP)

(72) Inventors: Yuki Hanzawa, Kusatsu (JP); Atsushi Irie, Nara (JP); Motoo Yamamoto, Kyoto (JP)

(73) Assignee: OMRON Corporation, Kyoto (JP)

(*) Notice: Subject to any disclaimer, the term of this patent is extended or adjusted under 35 U.S.C. 154(b) by 130 days.

(21) Appl. No.: 13/774,200

(22) Filed: Feb. 22, 2013

(65) Prior Publication Data

US 2013/0243272 A1   Sep. 19, 2013

(30) Foreign Application Priority Data

Mar. 15, 2012   (JP) .................. 2012-059389

(51) Int. Cl.
   *G06K 9/68*   (2006.01)
   *G06K 9/00*   (2006.01)
   *G06F 21/32*   (2013.01)

(52) U.S. Cl.
   CPC ............ *G06F 21/32* (2013.01); *G06K 9/00288* (2013.01); *G06K 9/68* (2013.01)

(58) Field of Classification Search
   None
   See application file for complete search history.

(56) References Cited

U.S. PATENT DOCUMENTS

| | | | |
|---|---|---|---|
| 5,864,630 A * | 1/1999 | Cosatto et al. | 382/103 |
| 7,016,885 B1 * | 3/2006 | Mikhael et al. | 706/20 |
| 7,120,278 B2 | 10/2006 | Sukegawa et al. | |
| 7,184,591 B2 * | 2/2007 | Thiesson et al. | 382/186 |
| 7,454,041 B2 | 11/2008 | Sukegawa et al. | |
| 7,505,621 B1 * | 3/2009 | Agrawal et al. | 382/159 |
| 7,801,337 B2 * | 9/2010 | Akahori et al. | 382/118 |

(Continued)

FOREIGN PATENT DOCUMENTS

| | | |
|---|---|---|
| JP | 2003-141542 A | 5/2003 |
| JP | 2010-092119 A | 4/2010 |

(Continued)

OTHER PUBLICATIONS

Oza, Nikunj C., and Kagan Tumer. "Classifier ensembles: Select real-world applications." Information Fusion 9.1 (2008): 4-20.*

(Continued)

*Primary Examiner* — Bhavesh Mehta
*Assistant Examiner* — Sean Conner
(74) *Attorney, Agent, or Firm* — Nutter McClennen & Fish LLP; John J. Penny, Jr.; Michael P. Visconti, III

(57) ABSTRACT

An authentication apparatus comprises an extraction part configured to extract a feature of a face from a face image of a user; a plurality of classifiers configured to identify the user by determining whether or not the feature extracted by the extraction part matches a feature of a face stored in a storage apparatus; a deriving part configured to derive a specific condition based on at least one of the feature extracted by the extraction part and information for authenticating the user; a selecting part configured to select at least one of the classifiers based on the specific condition; and an authentication part configured to authenticate the user when the selected classifier determines that the feature extracted by the extraction part matches the feature of the face stored in the storage.

7 Claims, 4 Drawing Sheets

(56) References Cited

U.S. PATENT DOCUMENTS

| | | | |
|---|---|---|---|
| 8,266,081 B2 | 9/2012 | Yokoi et al. | |
| 8,649,612 B1* | 2/2014 | Brunner | 382/224 |
| 2003/0128877 A1* | 7/2003 | Nicponski | 382/224 |
| 2006/0018521 A1* | 1/2006 | Avidan | 382/118 |
| 2008/0219517 A1* | 9/2008 | Blonk et al. | 382/118 |
| 2008/0247609 A1* | 10/2008 | Feris et al. | 382/118 |
| 2009/0175512 A1* | 7/2009 | Hyuga et al. | 382/118 |
| 2009/0190803 A1* | 7/2009 | Neghina et al. | 382/118 |
| 2009/0304290 A1* | 12/2009 | Fukaya et al. | 382/224 |
| 2010/0141787 A1* | 6/2010 | Bigioi et al. | 348/222.1 |
| 2010/0202707 A1* | 8/2010 | Costache et al. | 382/224 |
| 2010/0284622 A1* | 11/2010 | Kim et al. | 382/224 |
| 2010/0329544 A1* | 12/2010 | Sabe et al. | 382/159 |
| 2011/0135166 A1* | 6/2011 | Wechsler et al. | 382/118 |
| 2011/0299765 A1* | 12/2011 | Baker | 382/159 |

FOREIGN PATENT DOCUMENTS

| | | |
|---|---|---|
| JP | 2011-233119 A | 11/2011 |
| KR | 10-1087765 B1 | 11/2011 |

OTHER PUBLICATIONS

Su, Yu, et al. "Hierarchical ensemble of global and local classifiers for face recognition." Image Processing, IEEE Transactions on 18.8 (2009): 1885-1896.*

Roli, Fabio, et al. "An experimental comparison of classifier fusion rules for multimodal personal identity verification systems." Multiple Classifier Systems. Springer Berlin Heidelberg, 2002. 325-335.*

Korean Office Action for Application No. 10-2013-0018915 issued Feb. 25, 2014 (2 Pages).

Extended European Search Report for Application No. 13156059.1 issued Mar. 27, 2014 (8 Pages).

Lam, Louisa, Classifier combinations: Implementations and theoretical issues. Lecture notes in computer science / computational science (eurocrypt) CHES 2008. J. Kittler and F. Roli, eds. Springer-Verlag, Berlin, 2000, vol. 1857(21), pp. 77-86.

Tsai et al., Adaptive multiple experts system for personal identification using facial behaviour biometrics. Multimedia Signal Processing, Oct. 8, 2008, IEEE 10th Workshop, pp. 660-665.

* cited by examiner

AUTHENTICATION APPARATUS, CONTROL METHOD OF AUTHENTICATION APPARATUS, CONTROL PROGRAM AND RECORDING MEDIUM

BACKGROUND OF THE INVENTION

1. Technical Field

The present invention relates to an authentication apparatus and the like capable of authenticating a user registered in advance.

2. Related Art

It is important to ensure rigid security. For example, in a system enabling access to highly confidential personal information, it is essential to provide an apparatus that authenticates users registered in advance and rejects those accessing illegally.

On the other hand, high degree of accuracy in authentication and burden borne by user for the authentication are likely to be trade-off. For example, when a user is repeatedly requested to input a password in order to ensure authentication of the user, the burden borne by the user increases.

In order to solve the above trade-off, so-called "biometrics authentication" attracts attention. That is, an authentication apparatus performing authentication using biometrics information unique to each user such as fingerprint, vein and pupil is widely studied as an apparatus capable of achieving not only rigid security but also simple authentication (user's convenience). Among the above authentication apparatuses, "face authentication" using user's face is extensively studied as an authentication method causing the least burden borne by the user.

For example, Japanese Unexamined Patent Publication No. 2010-92119 (published on Apr. 22, 2010) describes a control apparatus quickly performing collation processing of input data and registered data while maintaining a high degree of security and collation accuracy. Japanese Unexamined Patent Publication No. 2011-233119 (published on Nov. 17, 2011) describes a measuring apparatus that achieves robust and high-speed attribute identification in a face direction of a subject.

Further, Japanese Unexamined Patent Publication No. 2003-141542 (published on May 16, 2003) describes a collation apparatus capable of maintaining a certain level of collation performance even when a similar face pattern exists in a dictionary for face collation.

However, the face authentication system using user's face as biometrics information involves the following two problems.

The first problem is that, in a classifier used in an authentication apparatus, the generalization performance and the identification performance are trade-off. More specifically, for example, when the classifier is designed to achieve identification performance even when a user executes face authentication in a manner different from a face image registered in advance (a case where the user registers a face image without wearing glasses, and the user tries to perform authentication with glasses on), the classifier is unable to identify the user under a particular condition, and the authentication accuracy of the authentication apparatus is extremely degraded.

The second problem is that a condition for selecting the classifier is not always given before the classifier performs identification. For the first problem, the following solution may be considered: the authentication apparatus has multiple classifiers specialized in particular conditions, and selects and uses the multiple classifiers in accordance with the condition. However, the condition for the selection may not be given before the selection.

None of Japanese Unexamined Patent Publication No. 2010-92119, Japanese Unexamined Patent Publication No. 2011-233119, and Japanese Unexamined Patent Publication No. 2003-141542 solves the first problem and the second problem explained above at the same time. For example, the control apparatus described in Japanese Unexamined Patent Publication No. 2010-92119 narrows down registration data by high-speed but low accuracy collation processing, and then switches to low-speed but high accuracy collation processing, thus trying to solve the first problem. However, the second problem is not considered. The technique described in Japanese Unexamined Patent Publication No. 2011-233119 or Japanese Unexamined Patent Publication No. 2003-141542 solves either one of the problems.

The present invention is made in view of the above problems, and it is an object of the present invention to provide an authentication apparatus and the like achieving highly-accurate face authentication in wide range of circumstances by solving the first problem and the second problem at the same time.

SUMMARY

In accordance with one aspect of at least one embodiment of the present invention, an authentication apparatus is an authentication apparatus comprising an extraction part configured to extract a feature of a face from a face image of a user, and a plurality of classifiers for identifying the user by determining whether or not the feature of the face extracted by the extraction part matches a feature of a face stored in a storage apparatus, a deriving part configured to derive a specific condition based on at least one of the feature extracted by the extraction part and information for authenticating the user, a selecting part configured to select at least one of the classifiers based on the specific condition, and an authentication part configured to authenticate the user when the selected classifier determines that the feature extracted by the extraction part matches the feature of the face stored in the storage apparatus.

In accordance with another aspect of at least one embodiment of the present invention, a control method of an authentication apparatus is a control method for an authentication apparatus, the authentication apparatus comprising an extraction part configured to extract a feature of a face from a face image of a user and a plurality of classifiers configure to identify the user by determining whether the feature of the face extracted in the extraction part matches a feature of a face stored in a storage apparatus, and the control method comprises a deriving step for deriving a specific condition in accordance with at least one of the feature of the face extracted in the extraction part and information for authenticating the user, a selecting step for selecting at least one of the classifiers from the plurality of classifiers in accordance with the specific condition derived in the deriving step, and an authentication step for authenticating the user when the selected classifier determines that the feature extracted by the extraction part matches the feature of the face stored in the storage apparatus.

According to the above configuration, the authentication apparatus of the present invention and the control method of the apparatus can derive a specific condition in accordance with at least one of the feature of the face extracted and the information for authenticating the user. The authentication apparatus and the method select at least one of the classifiers from the plurality of classifiers in accordance with the specific condition derived.

In other words, the authentication apparatus and the method derive the specific condition in accordance with whether a condition for selecting a classifier is available or not (given in advance or not) as the information for authenticating the user. Accordingly, the authentication apparatus and the method can solve the second problem that is caused when a condition for selecting a classifier is not available.

The authentication apparatus and the method can select an appropriate classifier from multiple classifiers in accordance with the derived condition. Accordingly, the authentication apparatus and the method can solve the first problem.

Therefore, the authentication apparatus and the control method of the apparatus of the present invention can solve the first problem and the second problem at the same time, and can achieve highly-accurate face authentication in wide range of circumstances.

In the authentication apparatus of at least one embodiment of the present invention, the information for authenticating the user includes at least one of the number of users registered to the storage apparatus, direction of the face of the user, attribute of the user, whether or not the user wears any accessory, environment where the face image is obtained, and date when the face image is obtained, and derives the at least one of them as one of the specific conditions.

According to the above configuration, when the number of users registered in the storage apparatus as the information for authenticating the user can be used, the authentication apparatus of the present invention derives the number of registered users as one of the specific conditions. Therefore, when the number of registered users dynamically changes, the authentication apparatus can achieve highly accurate face authentication.

The authentication apparatus also derives, as one of the specific conditions, at least one piece of information about direction of the face of the user, attribute of the user, whether or not the user wears any accessory, environment where the face image is obtained, and date when the face image is obtained, when the at least one of the information is available as the information for authenticating the user.

In this case, the direction of the face of the user is, for example, information such as Yow, Pitch, Roll, and the like. The attribute of the user is, for example, age, sex, race, expression, and feeling of the user. Whether or not the user wears any accessory means information indicating whether the face is covered or not due to sunglasses or a mask. The environment where the face image is obtained is information such as forward light, oblique light, backlight, and image quality. Each piece of the above information may be obtained by extracting it from the face image of the user, or may be obtained by extracting it from information and the like attached to the face image.

The authentication apparatus of the present invention uses at least one piece of the information as one of the specific conditions for selection of a classifier, and can achieve highly-accurate face authentication in wide range of circumstances.

In the authentication apparatus of at least one embodiment of the present invention, the deriving part derives the specific condition based on determination made by a specific classifier being predetermined on whether or not the feature extracted by the extraction part matches the feature of the face stored in the storage apparatus.

According to the configuration, the authentication apparatus of the present invention can narrow down users to be authenticated and classifiers suitable for identification of the user. Therefore, even when the number of registered users is large, and the feature of the face is high in diversity, the authentication apparatus can achieve high authentication accuracy.

In the authentication apparatus of at least one embodiment of the present invention, the classifier selected by the selecting part makes determination by using a feature of a face different from the feature of the face used by the specific classifier.

According to the above configuration, the classifier in the authentication apparatus of the present invention performs identification, using a feature of a face different from the feature of the face used by the specific classifier determined in advance. This is because the feature that is used by the predetermined specific classifier but with which the user cannot be identified is considered not to have sufficient amount of information for authenticating the user.

Therefore, the authentication apparatus can efficiently perform authentication using only the feature having a sufficient amount of information.

In the authentication apparatus of at least one embodiment of the present invention, the deriving part derives the specific condition for the selecting part to switch the classifiers until the classifier identifies the user.

According to the above configuration, the authentication apparatus of the present invention switches and uses the classifiers until the classifier identifies the user.

Therefore, the authentication apparatus of the present invention can achieve highly-accurate face authentication in wide range of circumstances.

In the authentication apparatus of at least one embodiment of the present invention, when the determination made by the selected classifier and the determination made by the specific classifier are obtained as real values, the authentication part calculates an average of these real values and authenticates a user of which the average value is the maximum.

Therefore, the authentication apparatus of the present invention can achieve highly-accurate face authentication in wide range of circumstances.

In accordance with still another aspect of at least one embodiment of the present invention, the authentication apparatus may also be achieved using a computer. In this case, by causing a computer to operate as each part of the authentication apparatus, the scope of the present invention encompasses the control program for achieving the authentication apparatus using the computer and a tangible, non-transitory computer-readable recording medium recorded with the control program.

As described above, the authentication apparatus of the present invention comprises a deriving part configured to derive a specific condition based on at least one of the feature of the face extracted by the extraction part and information for authenticating the user, a selecting part configured to select at least one of classifiers from a plurality of classifiers based on the specific condition, and an authentication part configured to authenticate the user when the selected classifier determines that the feature extracted by the extraction part matches the feature of the face stored in the storage apparatus.

The control method of the authentication apparatus of at least one embodiment of the present invention comprises a deriving step for deriving a specific condition in accordance with at least one of the feature of the face extracted in an extraction part and information for authenticating the user, a selecting step for selecting at least one of classifiers from a plurality of classifiers in accordance with the specific condition derived in the deriving step, and an authentication step for authenticating the user when the selected classifier determines that the feature extracted by the extraction part matches the feature of the face stored in the storage apparatus.

In other words, the authentication apparatus and the method derive the specific condition in accordance with whether a condition for selecting a classifier is available or not. The authentication apparatus and the method can select an appropriate classifier from multiple classifiers in accordance with the derived specific condition.

Therefore, the authentication apparatus and the control method of the apparatus of the present invention achieve the effect of being able to solve the first problem and the second problem at a time, and achieve highly-accurate face authentication in wide range of circumstances.

DETAILED DESCRIPTION

Figure 1:
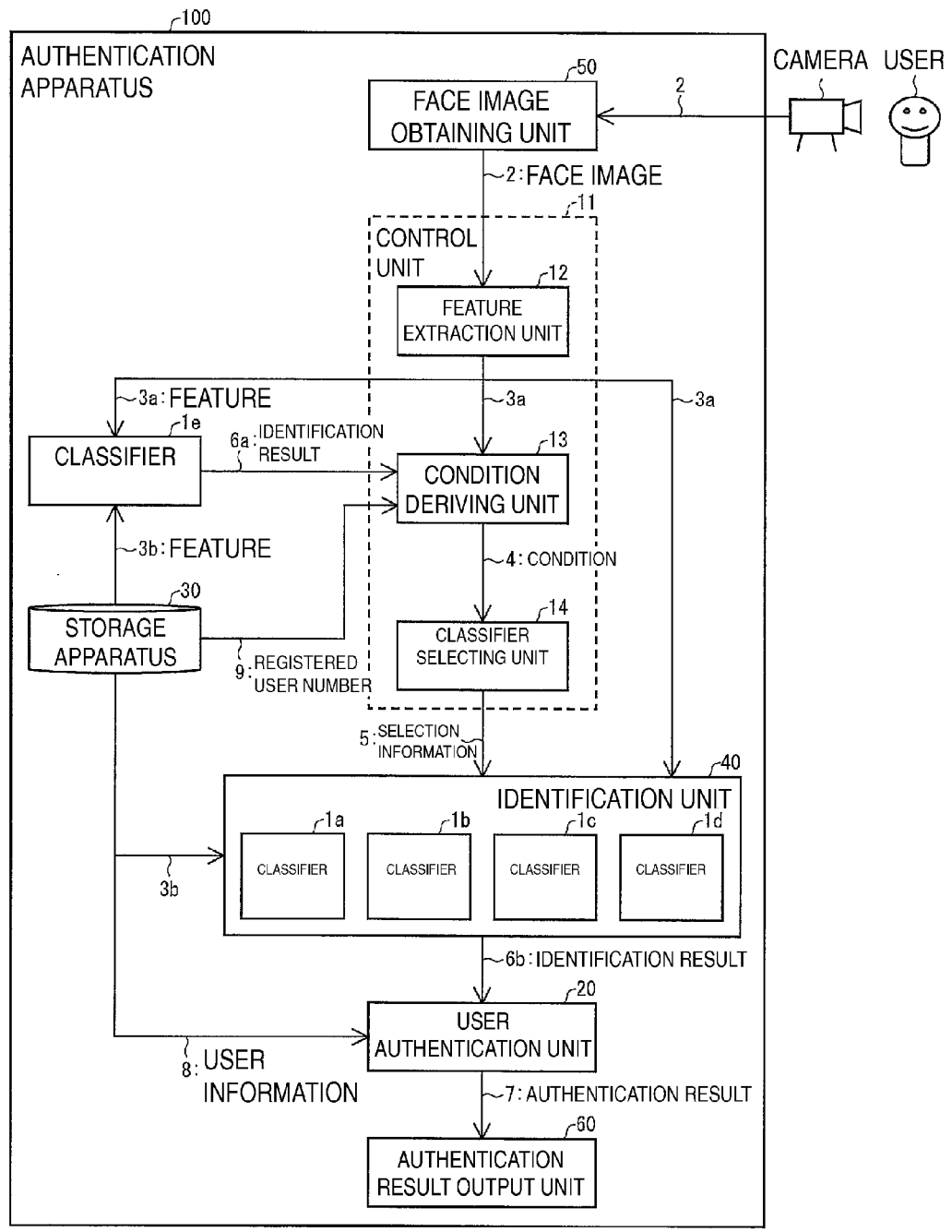
FIG. 1 is a block diagram illustrating an essential configuration of an authentication apparatus according to an embodiment of the present invention.

An embodiment of the present invention will be described in detail with reference to FIGS. 1 to 4.

In the description below, in order to indicate that there are multiple members, an alphabet in lower case may be additionally given to the same reference numeral of a member to represent the member. For example, an "classifier 1a" and an "classifier 1b" are shown. Alternatively, an alphabet additionally given to a reference numeral of a member may be omitted to collectively represent the member. For example, the classifiers 1a to 1e may be collectively referred to as "classifier 1".

[Overview of Authentication Apparatus 100]

Overview of an authentication apparatus 100 will be explained with reference to FIG. 1. FIG. 1 is a block diagram illustrating an essential configuration of the authentication apparatus 100.

The authentication apparatus 100 is an apparatus including a feature extraction unit 12 for extracting a feature 3a of a face from a face image 2 of a user and multiple types of classifiers 1a to 1d for identifying a user by determining whether the feature 3a matches a feature 3b of a face stored in a storage apparatus 30.

Figure 2:
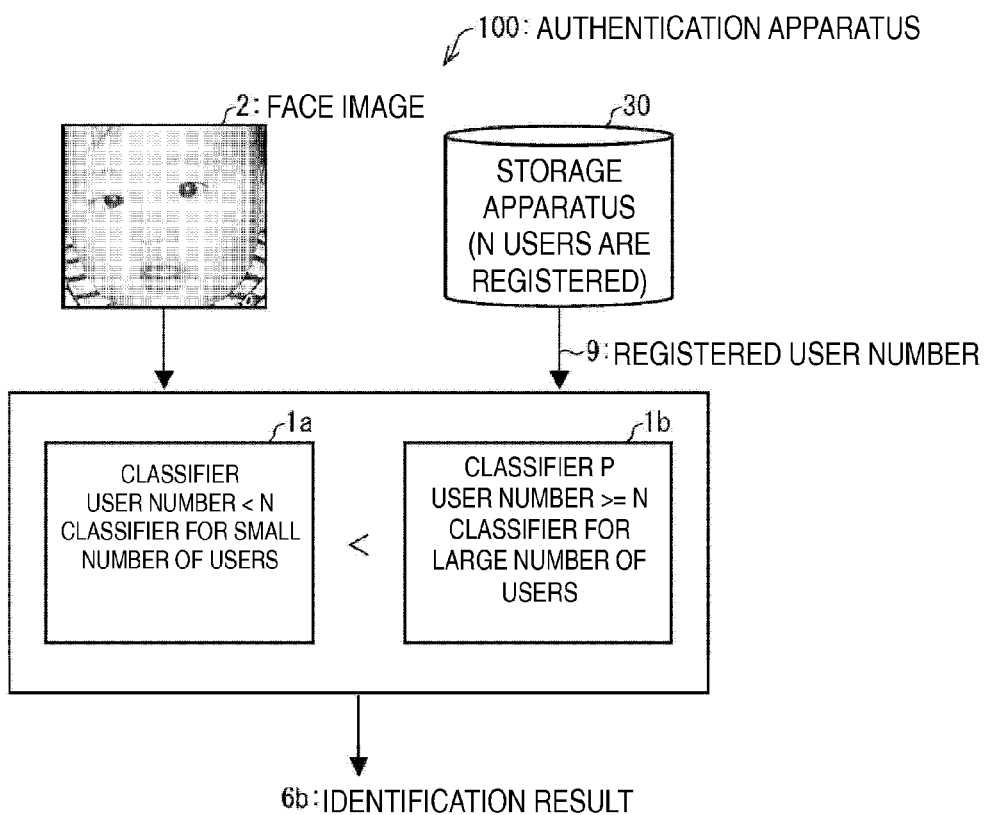
FIG. 2 is a schematic view illustrating basic operation of the authentication apparatus in a case where the authentication apparatus is given a condition for selecting a classifier.

Basic operation of the authentication apparatus 100 will be explained with reference to FIG. 2. FIG. 2 is a schematic view illustrating basic operation of the authentication apparatus 100 in a case where the authentication apparatus 100 is given a condition for selecting a classifier 1a or a classifier 1b.

The authentication apparatus 100 authenticates a user (hereinafter referred to as "registered user") registered in advance (whom feature 3b of face is stored in the storage apparatus 30) by identifying a face image 2 of the user with the classifier 1. In this case, the authentication apparatus 100 selects a classifier suitable for identifying the face image from multiple classifiers 1.

As shown in FIG. 2, for example, when the number of registered users (registered user number 9, registered user number, information for authenticating a user) is given as a condition for selecting the classifier 1a or the classifier 1b, the authentication apparatus 100 selects a classifier on the basis of the registered user number 9.

For example, as shown in FIG. 2, when the classifier 1a is a classifier achieving high identification performance where the registered user number 9 is less than n people (for example, n=10) and the classifier 1b is a classifier achieving high identification performance where the registered user number 9 is equal to or more than n people, the authentication apparatus 100 selects the classifier 1a or the classifier 1b in accordance with the current registered user number 9 given as a condition.

The performance of the classifier is dependent on the registered user number (the number of identification labels), and therefore, when the authentication apparatus includes only one classifier, the authentication accuracy changes in accordance with increase/decrease of the registered user number. For example, suppose that the classifier is optimized assuming that the registered user number is about 20 people. In this case, when 100 users are registered to the authentication apparatus, the classifier does not achieve expected performance, and the authentication accuracy of the authentication apparatus may be reduced (the first problem).

For this problem, when the registered user number 9 is given, the authentication apparatus 100 according to an embodiment of the present invention selects an optimum classifier 1 on the basis of this. Therefore, even when the registered user number 9 of the user dynamically changes, the authentication apparatus 100 can achieve high authentication accuracy.

For example, the performance of the classifier also depends on direction of the face of the user (Yow, Pitch, Roll, and the like), attribute of the user (age, sex, race, expression, feeling, and the like), whether or not the user wears any accessory (whether the face is covered or not due to sunglasses or a mask), environment where the face image is obtained (forward light, oblique light, backlight, image quality, and the like), and date when the face image is obtained. Each of the above information may be obtained by extracting it from the face image of the user, or may be obtained by extracting it from information and the like attached to the face image.

Therefore, when the above information is given, the authentication apparatus 100 selects an optimum classifier 1 on the basis of at least one of them (information for authenticating a user).

Figure 3:
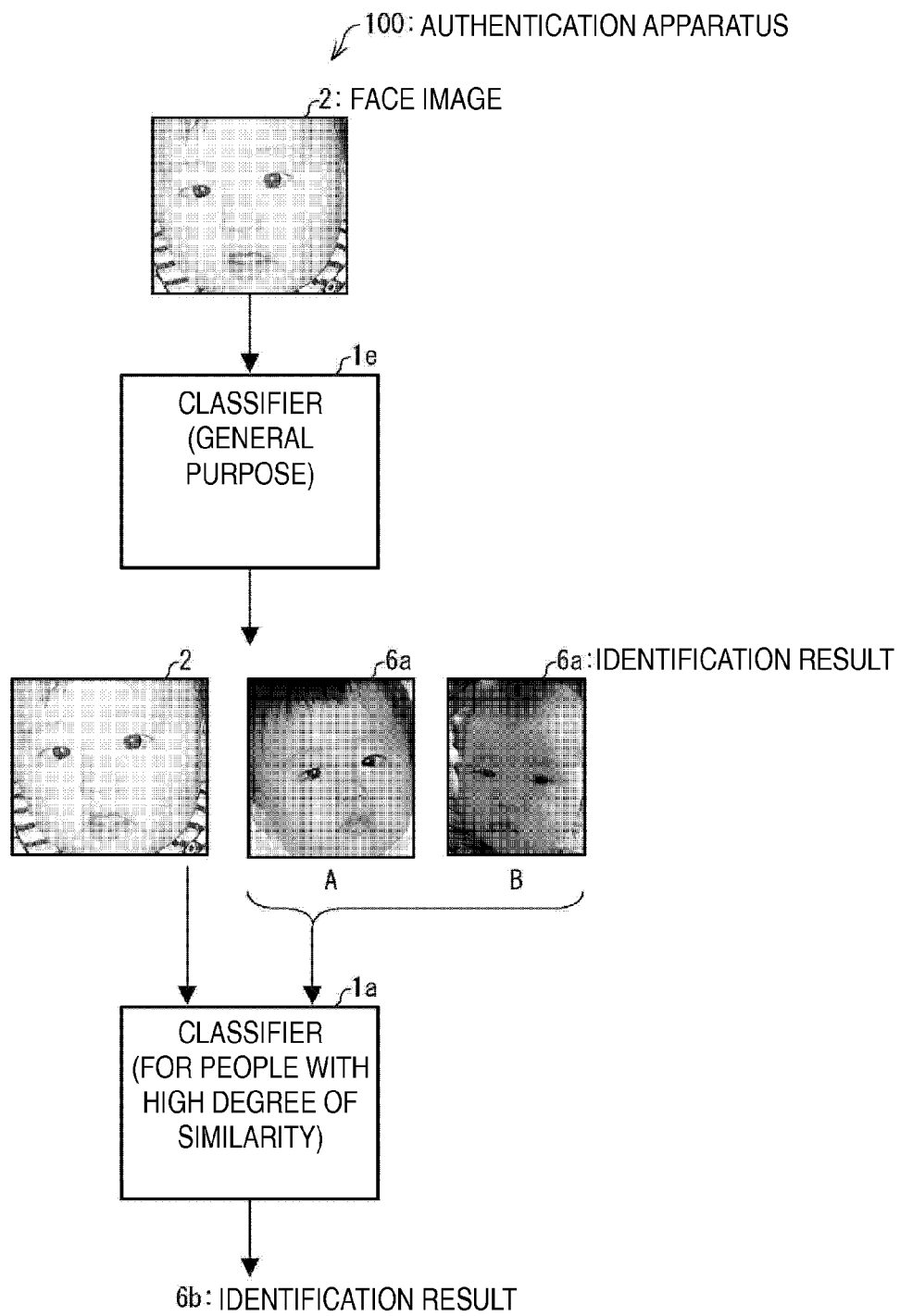
FIG. 3 is a schematic view illustrating basic operation of the authentication apparatus in a case where the authentication apparatus is not given a condition for selecting a classifier.

Different basic operation of the authentication apparatus 100 will be explained with reference to FIG. 3. FIG. 3 is a schematic view illustrating basic operation of the authentication apparatus 100 in a case where the authentication apparatus 100 is not given a condition for selecting a classifier.

When the authentication apparatus is used in actual environment, the feature 3 of the face or the registered user number that could be a condition for selecting a classifier may not always be given (the second problem). Even if given, the condition may not have a sufficient amount of information with which the classifier can be appropriately selected.

As shown in FIG. 3, when a condition for selecting a classifier 1 is not given, the authentication apparatus 100 derives a specific condition 4 from an identification result 6a given by the classifier 1e (classifier for selection determined in advance), and selects the classifier 1 on the basis of this.

The classifier 1e is a general classifier (wide range model). The classifier 1e achieves average performance regardless of the performance of the face image 2 (for example, even in a case of non-standard face image, e.g., the user does not face the front, or the user wears sunglasses), but may not perform such high performance as to be able to reliably identify who of the registered users the user of the face image 2 is.

For example, as shown in FIG. 3, when the classifier 1e narrows down candidates of the face image 2 to the registered user A and the registered user B, the authentication apparatus 100 selects a classifier 1 on the basis of the identification result (determined result) 6a given by the classifier 1e. More specifically, the authentication apparatus 100 selects the classifier 1a (local model) capable of reliably identifying which of the registered user A and the registered user B the user of the face image 2 is.

In this case, the classifier 1a preferably performs identification using a feature different from the feature 3 used by the classifier 1e. This is because the feature that is used by the classifier 1e but with which the user cannot be identified is considered not to have sufficient amount of information for authenticating the user. Alternatively, the classifier 1a may be of a higher degree (using larger amount of features) than the classifier 1e.

As described above, when a condition for selecting a classifier 1 is not given, the authentication apparatus 100 according to an embodiment of the present invention selects a classifier 1 on the basis of the identification result 6a of the classifier 1e determined in advance.

Accordingly, the authentication apparatus 100 can narrow down users to be authenticated and classifiers suitable for identification of the user. Therefore, for example, even when the registered user number 9 is high and accordingly the feature 3 is high in diversity, the authentication apparatus 100 can achieve high authentication accuracy.

In FIGS. 1 and 3, only one classifier 1e determined in advance is shown, but it may be possible to prepare multiple classifiers and allow the authentication apparatus 100 to use them in order, thus narrowing down users to be authenticated and classifiers suitable for identification of the user.

FIG. 3 shows a case where one classifier 1a is selected with the identification result 6a of the classifier 1e, but multiple classifiers may be selected. In this case, the authentication apparatus 100 switches and uses multiple selected classifiers in order, thus obtaining the identification result 6b for identifying the user.

Further, the authentication apparatus 100 may combine the identification result 6a of the classifier 1e determined in advance and the identification result 6b of the classifier 1a selected on the basis of the identification result, thus outputting a final identification result. In other words, when the identification result 6 is represented as a real value, i.e., "score", the authentication apparatus 100 may output, for example, an average value of the identification result 6a and the identification result 6b as a final identification result.

Further, when a condition for selecting a classifier 1 is given, the authentication apparatus 100 selects the classifier 1 in accordance with the condition, and thereafter, the authentication apparatus 100 can further select a classifier 1 again using the classifier 1e. Therefore, highly accurate authentication can be performed on the basis of more accurate identification result.

[Configuration of Authentication Apparatus 100]

The configuration of the authentication apparatus 100 will be explained with reference to FIG. 1. From the perspective of maintaining simplicity of description, a portion not related to the present embodiment is omitted from the explanation and the block diagram about the configuration. However, the authentication apparatus 100 may include the omitted configuration in accordance with circumstances of embodiments.

Hereinafter, the functions performed by each of a face image obtaining unit 50, a control unit 11 (a feature extraction unit 12, a condition deriving unit 13, a classifier selecting unit 14), a classifier 1e, an identification unit 40 (classifiers 1a to 1d, multiple types of classifiers), a storage apparatus 30, a user authentication unit 20, and an authentication result output unit 60 will explained in this order.

The face image obtaining unit 50 obtains the face image 2 of the user captured by an image-capturing apparatus (for example, digital camera) connected to be able to communicate with the face image obtaining unit 50 from the image-capturing apparatus. The face image obtaining unit 50 outputs the obtained face image 2 to the feature extraction unit 12.

The control unit 11 centrally controls various kinds of functions of the authentication apparatus 100, and includes the feature extraction unit 12, the condition deriving unit 13, and the classifier selecting unit 14. Each function of the control unit 11 may be achieved by causing a CPU (Central Processing Unit) to execute, for example, a program stored in a storage device such as a RAM (Random Access Memory) and a flash memory.

The feature extraction unit (extraction part) 12 extracts the feature 3a of the face of the user from the face image 2 of the user, and outputs the extracted feature 3a to the condition deriving unit 13, the classifier 1e, and the identification unit 40.

The condition deriving unit (deriving part) 13 determines whether the classifier selecting unit 14 is given a condition for selecting a classifier 1. When a condition for selection is given, the condition deriving unit 13 derives the condition for selection, as one of the conditions (specific condition) 4.

On the other hand, when a condition for selection is not given, the condition deriving unit 13 outputs, as one of the conditions 4, the identification result 6a obtained by determining whether the previously-determined classifier 1e determines agreement or not.

When the user number (registered user number 9) registered to the storage apparatus is given as a condition for selection, the condition deriving unit 13 can derive the registered user number 9 as one of the specific conditions 4 (FIG. 1 shows an example where the registered user number 9 is stored in the storage apparatus 30 in advance, and the condition deriving unit 13 reads the registered user number from the storage apparatus 30, and derives it as one of the specific conditions 4).

The condition deriving unit 13 can derive, as one of the specific conditions 4, at least one of direction of the face of the user, attribute of the user, whether the user wears accessory or not, environment where the face image is obtained, and date when the face image is obtained (in FIG. 1, instead of reading the registered user number 9 from the storage apparatus 30, for example, information about the direction of the face of the user extracted by the feature extraction unit 12 may be obtained from the feature extraction). At least one piece of information described above may be extracted using a publicly known technique.

Further, the condition deriving unit 13 may derive the result as one of the specific conditions 4 when a condition for selection is not given and the identification result 6a obtained by determining whether the previously-determined classifier 1e determines agreement or not is a result with which the user cannot be identified because there are multiple users that can be authenticated by the user authentication unit 20.

Alternatively, the condition deriving unit 13 may derive, as one of the specific conditions 4, a condition in which the classifier selecting unit 14 successively switches and selects the classifier until the user is identified by the classifier 1.

The condition deriving unit 13 outputs the condition 4 derived as described above to the classifier selecting unit 14.

The classifier selecting unit (selecting part) 14 selects the classifiers 1a to 1d in accordance with the specific condition 4 derived by the condition deriving unit 13. The classifier selecting unit 14 outputs selection information 5 for specifying the selected classifier to the identification unit 40.

The classifier (classifier determined in advance) 1e determines whether the feature 3a of the face extracted by the feature extraction unit 12 matches the feature 3b of the face stored in the storage apparatus 30. The classifier 1e outputs the identification result 6 indicating the result of the above determination to the condition deriving unit 13.

The identification unit 40 enters the feature 3a received from the feature extraction unit 12 and the feature 3b read from the storage apparatus 30 into the classifier indicated by the selection information 5 which is received from the classifier selecting unit 14. Then, the identification result 6b given by the classifier is output to the user authentication unit 20.

The identification unit 40 includes the classifiers 1a to 1d. In the same manner as the classifier 1e, the classifiers 1a to 1d determine whether the feature 3a matches the feature 3b or not.

Nonparametric methods for measuring a distance in a feature space such as k-nearest neighbor algorithm may be used as the classifiers 1a to 1e. For example, a method based on a model (parametric model including linear, nonlinear type) specified by a predetermined parameter such as neural network and support vector machine can be used.

The storage apparatus 30 is a nonvolatile storage device capable of storing information about the feature 3b, the registered user number 9, and the registered user (user information 8). For example, the storage apparatus 30 can be constituted by a hard disk, a semiconductor memory, a DVD, and the like. In the present embodiment, the storage apparatus 30 is shown in FIG. 1 as a device incorporated into the authentication apparatus 100, but it may be an external storage apparatus connected with the outside of the authentication apparatus 100 to be able to communicate therewith.

When the classifier 1 selected by the classifier selecting unit 14 determines that the feature 3 of the face is in agreement, the user authentication unit (authentication part) 20 authenticates the user having the feature of the face in agreement. More specifically, when the identification result 6b received from the identification unit 40 identifies (uniquely identifies) a registered user, the user authentication unit 20 determines that the user of the authentication apparatus 100 is the same as the registered user identified, and outputs the authentication result 7 to the authentication result output unit 60.

On the other hand, when the identification result 6b received from the identification unit 40 does not identify (does not uniquely identify) the registered user, the user authentication unit 20 determines that the user of the authentication apparatus 100 is different from the registered user identified, and outputs the authentication result 7 to the authentication result output unit 60.

When a condition for selection is not given, and the identification result 6a given by the classifier 1e and the identification result 6b given by the classifier 1 selected by the classifier selecting unit 14 are obtained as real values, the user authentication unit 20 may calculate an average value of these two results, and may authenticate a user of which average value is the maximum.

The authentication result output unit 60 is an apparatus outputting the authentication result 7 which is received from the user authentication unit 20. In the present embodiment, a liquid crystal display (LCD) is mainly assumed. However, the type of hardware is not limited as long as it is an apparatus having a function of notifying a user of an authentication result. For example, when the authentication apparatus 100 notifies the user of the authentication result 7 using sound, the authentication result output unit 60 may be a speaker.

When the user authentication unit 20 determines that the user of the authentication apparatus 100 is the same as the registered user, the user authentication unit 20 may allow the user information 8 of the user read from the storage apparatus 30 to be incorporated into the authentication result 7, and may output the authentication result to the authentication result output unit 60. Thus, the authentication result output unit 60 can look up the user information 8 to, for example, display the name of the user on a display, and emit sound according to the user.

[Processing Executed by Authentication Apparatus 100]

Figure 4:
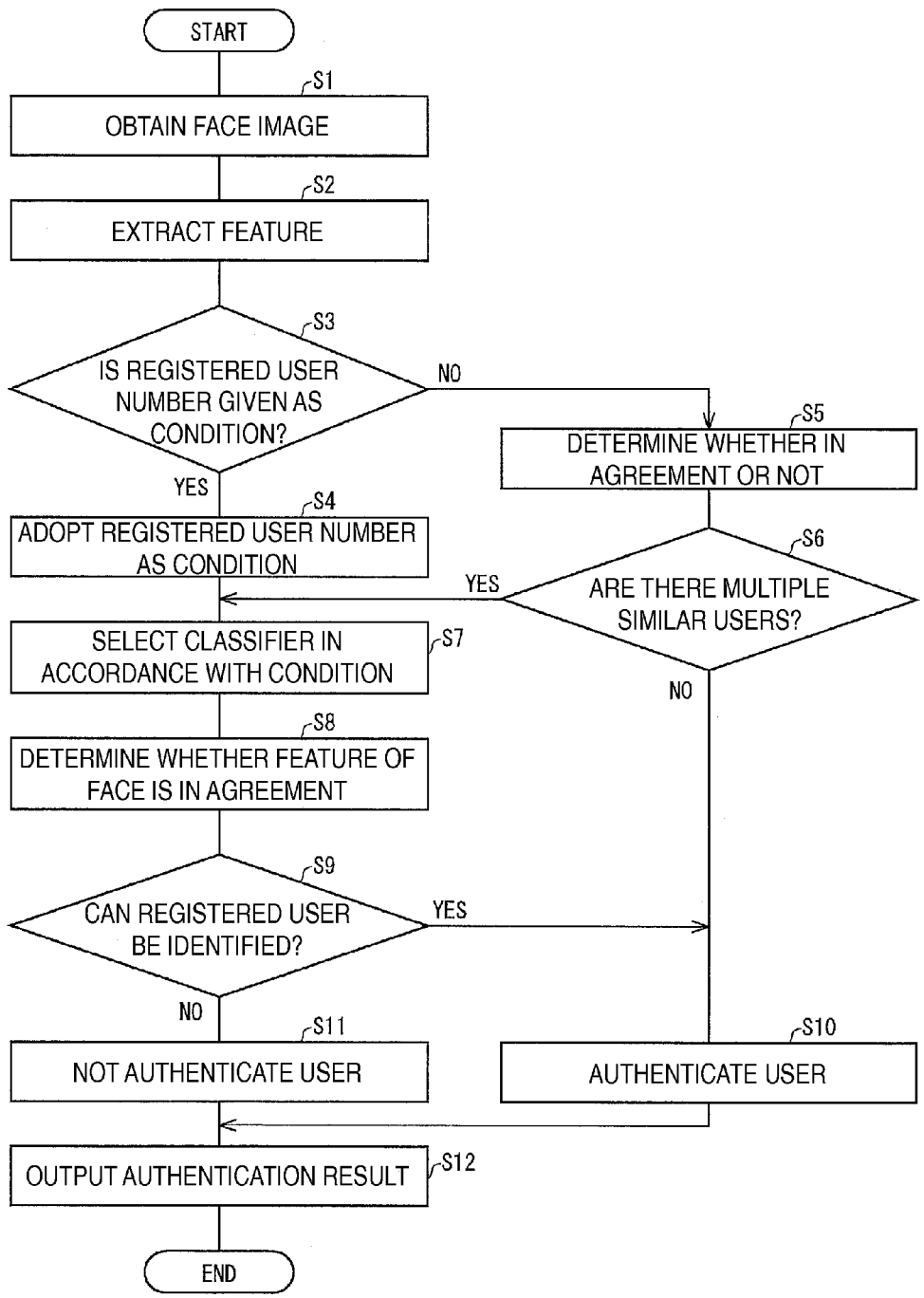
FIG. 4 is a flowchart illustrating an example of processing executed by the authentication apparatus.

A flow of processing executed by the authentication apparatus 100 will be explained with reference to FIG. 4. FIG. 4 is a flowchart illustrating an example of processing executed by the authentication apparatus 100. In the explanation below, "*** step" in parentheses represents each step of a control method.

First, the face image obtaining unit 50 obtains the face image 2 of the user (step 1: hereinafter abbreviated as S1). Subsequently, the feature extraction unit 12 extracts the feature 3a of the face of the user from the face image (S2, extraction step).

The condition deriving unit 13 determines whether a condition according to which the classifier selecting unit 14 selects a classifier 1 is given or not. The condition deriving unit 13 determines whether, for example, the registered user number 9 is given as a condition for selection (S3). When the registered user number 9 is determined to be given as a condition for selection (YES in S3), condition deriving unit 13 derives the registered user number 9 as one of the specific conditions 4 (S4, deriving step).

The explanation about S3 and S4 and FIG. 4 show an example of "whether or not the registered user number 9 is given as a condition for selection", but as described above, the determination in S3 may be direction of the face of the user, attribute of the user, whether or not the user wears any accessory (whether the face is covered or not), environment where the face image is obtained (forward light, oblique light, backlight, image quality, and the like), date when the face image is obtained, and the like.

For example, the user wears sunglasses, so that when "the face is determined to be covered" in S3, "the face is covered" is adopted as a condition in S4. More specifically, for example, a flag indicating that the face is covered is set.

On the other hand, when the registered user number 9 is determined not to be given as a condition for selection (NO in S3), the condition deriving unit 13 causes the classifier 1e to determine agreement or not (S5), and derives the identification result 6a obtained from the determination, as one of the specific conditions 4 (S6, deriving step). More specifically, when the identification result 6a indicates that "there are multiple similar users" (there are multiple applicable results as users that can be authenticated, YES in S6), the condition deriving unit 13 derives the multiple users as one of the specific conditions 4. On the other hand, when the identification result 6a uniquely identifies the user (NO in S6), the user authentication unit 20 authenticates the user (S10, authentication step).

The classifier selecting unit 14 selects a classifier according to the condition 4 derived by the condition deriving unit 13 (S7, selection step). The selected classifier 1 determines whether the feature 3a matches the feature 3b or not (S8). When the identification result 6b based on the determination identifies (uniquely identifies) the registered user (YES in S9), the user authentication unit 20 authenticates the user (S10, authentication step).

On the other hand, when the identification result 6b does not identify (does not uniquely identify) the registered user (NO in S9), the user authentication unit 20 does not authenticate the user (S11). The authentication result output unit 60 outputs the authentication result 7 (S12).

[Advantages Achieved by Authentication Apparatus 100]

In accordance with whether or not a condition for selecting classifiers 1a to 1d is given or not, the authentication apparatus 100 switches whether to derive the given condition as it is or to dynamically derive the condition. The authentication apparatus 100 appropriately selects one of multiple classifiers 1a to 1d in accordance with the derived condition 4.

Therefore, the authentication apparatus 100 achieves the effect of being able to solve the first problem and the second problem at a time and achieve highly-accurate face authentication in wide range of circumstances.

[Combination of Configurations (Technical Means) Included in Each Embodiment]

It is to be noted that the configurations included in the above embodiment may be combined as necessary. More specifically, all the configurations explained in the above embodiment is not limited to the embodiment explained, but all or some of the configurations may be used in combination in other embodiments, and embodiments obtained therefrom are also included in the technical scope of the present invention.

[Example of Embodiment with Software]

Finally, each block (in particular, the control unit 11) of the authentication apparatus 100 may be achieved as hardware using logic circuits formed on a semiconductor circuit (IC chip), or may be achieved as software using a CPU.

In the latter case, the authentication apparatus 100 includes a CPU executing commands of program achieving each function, a ROM (Read Only Memory) storing the program, a RAM in which the program is extracted, a storage apparatus (recording medium) storing various kinds of data and program, such as memory, and the like. Further, an object of the present invention can also be achieved by providing, to the authentication apparatus 100, a computer-readable recording medium storing program codes of control programs of the authentication apparatus 100 (execution format program, intermediate code program, source program) which are software for achieving the above functions, and causing the computer (or a CPU and an MPU) to read and execute the program codes recorded in the recording medium.

Examples of the recording media include tapes such as a magnetic tape and a cassette tape, disks including a magnetic disk such as a floppy (registered trademark) disk/a hard disk and optical disks such as CD-ROM/MO/MD/DVD/CD-R, cards such as an IC card (including memory card)/optical card, semiconductor memories such as mask ROM/EPROM/EEPROM/flash ROM, or logic circuits such as a PLD (Programmable logic device) and an FPGA (Field Programmable Gate Array.

The authentication apparatus 100 may be configured to be connectable to a communication network, and the program codes may be provided via the communication network. The communication network is not particularly limited as long as it can transmit the program codes. For example, the internet, intranet, extranet, LAN, ISDN, VAN, CATV communication network, Virtual Private Network, telephone circuit, mobile communication network, satellite communication network, and the like can be used. The transmission medium constituting the communication network may be a medium capable of transmitting the program codes and is not limited to any particular configuration or type. For example, wired media such as IEEE1394, USB, Power Line Communication, cable TV network, telephone line, and ADSL line (Asymmetric Digital Subscriber Line) can be used, and in addition, wireless media such as infrared such as IrDA and remote controller, Bluetooth (registered trademark), IEEE802.11 wireless network, HDR (High Data Rate), NFC (Near Field Communication), DLNA (Digital Living Network Alliance), mobile telephone network, satellite circuit, digital terrestrial network, and the like can also be used. In the present invention, the program codes can also be achieved as a form of a computer data signal embedded into a carrier embodied as electronic transmission.

As described above, in this specification, the parts do not necessarily means physical parts, and a case where the function of each part is achieved with software is also included. Further, the function of a part may be achieved by two or more physical parts, or the functions of two or more parts may be achieved by one physical part.

The present invention can be generally applied to apparatuses (face authentication systems) authenticating a user using a face image of the user.

The invention claimed is:

1. An authentication apparatus comprising a CPU or hardware logic circuits configured to form the following components:

an extraction part configured to extract a feature of a face from a face image of a user;

a plurality of classifiers configured to identify the user by determining whether or not the feature extracted by the extraction part matches a feature of a face stored in a storage apparatus;

a deriving part configured to derive a specific condition based on at least one of the feature extracted by the extraction part and information for authenticating the user;

a specific classifier configured to narrow down the number of user candidates to be authenticated, wherein the derivation of the specific condition comprises one of a first process of comparing a total number of users registered in the storage apparatus with a predetermined threshold, and a second process of determining, by the specific classifier, whether or not the feature extracted by the extraction part matches the feature of the face stored in the storage apparatus;

a selecting part configured to select at least one of the plurality of classifiers based on the specific condition, wherein when the derivation of the specific condition comprises the first process, the selecting part selects a first classifier among the plurality of classifiers if the total number of users registered in the storage apparatus is less than the predetermined threshold, and the selecting part selects a second classifier among the plurality of classifiers if the total number of users registered in the storage apparatus is greater than or equal to the predetermined threshold, the second classifier being different from the first classifier, wherein when the derivation of the specific condition comprises the second process, the selecting part selects a third classifier among the plurality of classifiers based on the user candidates narrowed down by the specific classifier; and an authentication part configured to authenticate the user when the selected classifier determines that the feature extracted by the extraction part matches the feature of the face stored in the storage apparatus.

2. The authentication apparatus according to claim 1, wherein the information for authenticating the user includes at least one of the number of users, a direction of the face of the user, attribute of the user, whether or not the user wears any accessory, environment where the face image is obtained, and date when the face image is obtained.

3. The authentication apparatus according to claim 1, wherein the selected classifier makes determination by using a feature of a face different from the feature of the face used by the specific classifier.

4. The authentication apparatus according to claim 1, wherein the deriving part derives the specific condition for the selecting part to switch the classifiers until the classifier identifies the user.

5. The authentication apparatus according to claim 1, wherein, when the determination made by the selected classifier and the determination made by the specific classifier are obtained as real values, the authentication part calculates an average of these real values and authenticates a user of which the average value is the maximum.

6. A control method for an authentication apparatus, the authentication apparatus comprising a CPU or hardware logic circuits configured to form an extraction part configured to extract a feature of a face from a face image of a user, a plurality classifiers configured to identify the user by determining whether the feature of the face extracted by the extraction part matches a feature of a face stored in a storage apparatus, and a specific classifier being predetermined and configured to narrow down the number of user candidates to be authenticated, the control method comprising:

a deriving step for deriving a specific condition in accordance with at least one of the feature of the face extracted by the extraction part and information for authenticating the user, wherein the deriving the specific condition comprises one of a first process of comparing a total number of users registered in the storage apparatus with a predetermined threshold, and a second process of determining, by the specific classifier, whether or not the feature extracted by the extraction part matches the feature of the face stored in the storage apparatus;

a selecting step for selecting at least one of the plurality of classifiers in accordance with the specific condition derived in the deriving step, wherein when the deriving the specific condition comprises the first process, the selecting comprises selecting a first classifier among the plurality of classifiers if the total number of users registered in the storage apparatus is less than the predetermined threshold, and the selecting comprises selecting a second classifier among the plurality of classifiers if the total number of users registered in the storage apparatus is greater than or equal to the predetermined threshold, the second classifier being different from the first classifier, wherein when the deriving the specific condition comprises the second process, the selecting comprises selecting a third classifier among the plurality of classifiers based on the user candidates narrowed down by the specific classifier; and an authentication step for authenticating the user when the selected classifier determines that the feature extracted by the extraction part matches the feature of the face stored in the storage apparatus.

7. A non-transitory computer-readable recording medium recording a control program for operating the authentication apparatus according to claim 1 and causing a computer to function as each of the parts.

* * * * *